United States Patent
Chen et al.

(10) Patent No.: US 8,429,346 B1
(45) Date of Patent: Apr. 23, 2013

(54) AUTOMATED DATA RELOCATION AMONG STORAGE TIERS BASED ON STORAGE LOAD

(75) Inventors: Xiangping Chen, Shrewsbury, MA (US); Khang Can, Framingham, MA (US); Manish Madhukar, Shrewsbury, MA (US); David Harvey, Newton, MA (US); Dean Throop, Efland, NC (US); Mark Ku, Wollaston, MA (US)

(73) Assignee: EMC Corporation, Hopkinton, MA (US)

( * ) Notice: Subject to any disclaimer, the term of this patent is extended or adjusted under 35 U.S.C. 154(b) by 329 days.

(21) Appl. No.: 12/647,867

(22) Filed: Dec. 28, 2009

(51) Int. Cl.
*G06F 12/00* (2006.01)

(52) U.S. Cl.
USPC .... 711/114; 711/165; 711/170; 711/E12.084; 709/213; 709/165; 709/170; 709/171; 709/173; 709/214; 709/215; 709/216; 709/217; 709/218; 709/219

(58) Field of Classification Search .................. None
See application file for complete search history.

(56) References Cited

U.S. PATENT DOCUMENTS

| | | | | |
|---|---|---|---|---|
| 5,450,595 A | * | 9/1995 | Chen et al. | 1/1 |
| 5,550,998 A | * | 8/1996 | Willis et al. | 711/114 |
| 5,559,984 A | * | 9/1996 | Nakano et al. | 711/121 |
| 5,742,792 A | * | 4/1998 | Yanai et al. | 711/162 |
| 6,366,987 B1 | * | 4/2002 | Tzelnic et al. | 711/162 |
| 6,876,559 B1 | * | 4/2005 | Rathnavelu et al. | 365/49.1 |
| 7,139,933 B2 | * | 11/2006 | Hsu et al. | 714/6.31 |
| 7,305,536 B2 | * | 12/2007 | Tabata et al. | 711/165 |
| 7,444,483 B2 | * | 10/2008 | Taguchi et al. | 711/156 |
| 7,447,838 B2 | * | 11/2008 | Aoyama | 711/114 |
| 2002/0188592 A1 | * | 12/2002 | Leonhardt et al. | 707/1 |
| 2006/0004958 A1 | * | 1/2006 | Takahashi | 711/113 |

OTHER PUBLICATIONS

Yuanyuan Zhou, "Algorithms", Usenix, Apr. 29, 2001, pp. 1-2, http://www.usenix.org/event/usenix01/full_papers/zhou/zhou_html/node3.html.*
U.S. Appl. No. 12/494,622, filed Jun. 30, 2009.
U.S. Appl. No. 12/640,254, filed Dec. 17, 2009.
U.S. Appl. No. 12/640,292, filed Dec. 17, 2009.

* cited by examiner

*Primary Examiner* — Edward Dudek, Jr.
*Assistant Examiner* — Christopher Birkhimer
(74) *Attorney, Agent, or Firm* — Nutter McClennen & Fish LLP

(57) ABSTRACT

Methods and systems are disclosed for relocating data in a physical storage pool comprising a plurality of storage tiers having differing performance characteristics, the physical storage pool being mapped into one or more logical units, each logical unit comprising a plurality of logical slices of data storage. The methods and systems can involve receiving a relocation list, the relocation list including, for each of a plurality of logical slices, a slice identifier, a temperature value, and a current physical location, determining a destination tier for each logical slice on the relocation list, evaluating for each logical slice on the relocation list a performance gain expected to be achieved by moving the logical slice from its current physical location to a new location in the destination tier, and relocating data in a logical slice from its current physical location to the new location based on the evaluation.

19 Claims, 7 Drawing Sheets

| T1 | H | C | C | M | H |
|----|---|---|---|---|---|
| T2 | C | C | C | M | M |
| T3 | H | H | C | M | C |
| T4 | H | M | H | M | C |

FIG. 3

| T1 | H | H | H | H | H |
|----|---|---|---|---|---|
| T2 | H | M | M | M | M |
| T3 | M | M | C | C | C |
| T4 | C | C | C | C | C |

| RELOCATION CANDIDATE LIST | | | | |
|---|---|---|---|---|
| SLICE_ID | SLICE_TEMP | CURRENT_TIER | DEST_TIER | ... |
| 0_08 | 97 | T4 | T1 | |
| 1_34 | 58 | T3 | T2 | |
| N_93 | 21 | T1 | T4 | |
| 0_25 | 34 | T3 | T3 | |
| 0_12 | 65 | T4 | T2 | |
| 1_75 | 99 | T2 | T1 | |
| N_27 | 87 | T3 | T1 | |
| N_65 | 85 | T2 | T1 | |
| 0_91 | 62 | T4 | T2 | |
| 0_34 | 21 | T2 | T4 | |
| 0_84 | 15 | T3 | T4 | |
| ... | | | | |
| 1_43 | 72 | T1 | T2 | |

*FIG. 7*

| LU 0 | | | | |
|---|---|---|---|---|
| SLICE_ID | SLICE_TEMP | CURRENT_TIER | DEST_TIER | ... |
| 0_08 | 97 | T4 | T1 | |
| 0_12 | 65 | T4 | T2 | |
| 0_91 | 62 | T4 | T2 | |
| 0_25 | 34 | T3 | T3 | |
| 0_34 | 21 | T2 | T4 | |
| 0_84 | 15 | T3 | T4 | |
| ... | | | | |

| LU 1 | | | | |
|---|---|---|---|---|
| SLICE_ID | SLICE_TEMP | CURRENT_TIER | DEST_TIER | ... |
| 1_75 | 99 | T2 | T1 | |
| 1_43 | 72 | T1 | T2 | |
| 1_34 | 58 | T3 | T2 | |
| ... | | | | |

...

| LU N | | | | |
|---|---|---|---|---|
| SLICE_ID | SLICE_TEMP | CURRENT_TIER | DEST_TIER | ... |
| N_27 | 87 | T3 | T1 | |
| N_65 | 85 | T2 | T1 | |
| N_93 | 21 | T1 | T4 | |
| ... | | | | |

*FIG. 8*

| EXECUTION LIST | | | | | |
|---|---|---|---|---|---|
| SLICE_ID | SLICE_TEMP | CURRENT_TIER | DEST_TIER | DEST_RG | ... |
| 0_08 | 97 | T4 | T1 | RG1 | |
| 1_75 | 99 | T2 | T1 | RG2 | |
| N_27 | 87 | T3 | T1 | RG3 | |

| LU 0 | | | | |
|---|---|---|---|---|
| SLICE_ID | SLICE_TEMP | CURRENT_TIER | DEST_TIER | ... |
| 0_12 | 65 | T4 | T2 | |
| 0_91 | 62 | T4 | T2 | |
| 0_25 | 34 | T3 | T3 | |
| 0_34 | 21 | T2 | T4 | |
| 0_84 | 15 | T3 | T4 | |
| ... | | | | |

| LU 1 | | | | |
|---|---|---|---|---|
| SLICE_ID | SLICE_TEMP | CURRENT_TIER | DEST_TIER | ... |
| 1_43 | 72 | T1 | T2 | |
| 1_34 | 58 | T3 | T2 | |
| ... | | | | |

...

| LU N | | | | |
|---|---|---|---|---|
| SLICE_ID | SLICE_TEMP | CURRENT_TIER | DEST_TIER | ... |
| N_65 | 85 | T2 | T1 | |
| N_93 | 21 | T1 | T4 | |
| ... | | | | |

AUTOMATED DATA RELOCATION AMONG STORAGE TIERS BASED ON STORAGE LOAD

RELATED APPLICATIONS

This application claims priority to U.S. Provisional Patent Application No. 61/274,117 filed on Dec. 17, 2009 and entitled "AUTOMATED DATA RELOCATION AMONG STORAGE TIERS BASED ON STORAGE LOAD," which application is incorporated herein by reference in its entirety. This application is also related to U.S. patent application Ser. Nos. 12/640,254 and 12/640,292, both filed on Dec. 17, 2009 and both incorporated herein by reference in their entirety.

FIELD

The present invention relates to methods and systems for managing data in a storage environment and in particular to methods and systems for relocating data among tiers of storage.

BACKGROUND

Information services and data processing industries in general have rapidly expanded as a result of the need for computer systems to manage and store large amounts of data. As an example, financial service companies such as banks, mutual fund companies and the like now, more than ever before, require access to many terabytes of data and files stored in high capacity data storage systems. Other types of service companies have similar needs for data storage.

Data storage system developers have responded to the increased need for storage by integrating high capacity data storage systems, data communications devices (e.g., switches), and computer systems (e.g., host computers or servers) into so-called "storage networks" or "Storage Area Networks" (SANs).

A variety of storage systems (also referred to herein as "storage arrays" or simply "arrays") are known in the art. One example of a storage system is a collection of storage devices (e.g. hard disk drives, solid-state disk drives, flash memory drives, and/or magnetic tapes) and associated communication, power, cooling, and management components. Such storage systems can also include one or more storage processors for handling both requests for allocation and input/output (IO) requests from a user. A storage processor can be the controller for and primary interface to the storage system.

Storage systems are typically used to provide storage space for one or more computer file systems, databases, applications, and the like. For this and other reasons, it is common for storage systems to be logically partitioned into chunks of storage space. This allows a unified storage system to appear as a collection of separate file systems, network drives, etc. Storage systems can be logically partitioned in a variety of ways. For example, the storage devices (e.g., disk drives) of a storage system can be logically organized into one or more RAID groups. A RAID group is a group of physical storage devices across which data can be distributed and/or replicated to achieve redundancy. This can avoid the loss or unavailability of data arising from a hardware failure such as a disk drive failure.

Alternatively, or in addition, the physical storage area of a storage system can be divided into discrete units called slices. A collection of slices along with a map can create a "logical unit" (LU). A logical unit can then be described as a set of logical slices, with each logical slice mapping to one or more physical slices in the storage system.

In a storage area network, a collection of storage systems can be networked together via a switching fabric to a number of host computer systems operating as servers. The host computers can access data stored in the storage systems (of a respective storage area network) on behalf of client computers that request data from the data storage systems. For example, according to conventional applications, upon receiving a storage access request, a respective host computer in the storage area network can access a large repository of storage through the switching fabric of the storage area network on behalf of the requesting client. Thus, via the host computer (e.g., server), the client has access to the shared storage system. In many applications, storage area networks support high-speed acquisitions of data so that the host servers are able to promptly retrieve data from and store data to the storage system.

A storage area network can also be logically divided into one or more "storage pools." A storage pool can be a collection of one or more storage systems, a collection of subsets of one or more storage systems, or a subset of a single storage system. Thus, a storage pool can contain one or more logical units, and each logical unit can include one or more slices.

Performance of a storage system can be characterized by the system's total capacity, response time, throughput, and/or various other metrics. The capacity of a storage system is the maximum total amount of data that can be stored on the system. The response time of a storage system is the amount of time required to read data from or write data to the storage system. The throughput of a storage system is a measure of the amount of data that can be transferred into or out of (i.e., written to or read from) the storage system over a given period of time. Performance of a storage system can be measured and/or quantified at various levels, such as at the storage pool level, at the logical unit level, at the logical slice level, at the storage system level, at the RAID group level, at the disk level, etc.

The administrator of a storage array can desire to operate the storage system in a manner that maximizes throughput and minimizes response time. In general, performance of a storage system can be constrained by both physical and temporal constraints. Examples of physical constraints include bus occupancy and availability, excessive disk arm movement, and uneven distribution of load across disks or across RAID groups. Examples of temporal constraints include bus bandwidth, bus speed, spindle rotational speed, serial versus parallel access to multiple read/write heads, and the size of data transfer buffers.

One factor that can limit the performance of a storage system is the performance of each individual storage device. For example, the read access time of a storage system including hard disk drives is constrained by the access time of the disk drive from which the data is being read. Read access time can be affected by physical characteristics of the disk drive, such as the number of revolutions per minute of the spindle: the faster the spin, the less time it takes for the sector being read to come around to the read/write head. The placement of the data on the platter also affects access time, because it takes time for the arm to move to, detect, and properly orient itself over the proper track (or cylinder, for multi-head/multi-platter drives). Reducing the read/write arm swing reduces the access time. Finally, the type of drive interface can have a significant impact on overall disk array performance. For example, a multi-head drive that supports reads or writes on all heads in parallel will have a much greater throughput than a multi-head drive that allows only one head at a time to read or write data.

Furthermore, even if a disk-based storage system uses the fastest disks available, the performance of the storage system can be unnecessarily limited if only one of those disks can be accessed at a time. In other words, performance of a storage system, whether it is an array of disks, tapes, flash drives, or other storage devices, can also be limited by system constraints, such the number of data transfer buses available in the system and the density of traffic on each bus.

Within a given storage pool, there can thus exist multiple tiers (e.g., storage systems or subsets thereof) having differing performance characteristics. For example, one storage pool could have three different performance tiers. A first tier could include several RAID groups of a disk-based storage system that correspond to a collection of solid-state disk drives. A second, lower performance tier could include several RAID groups of the same disk-based storage system that correspond to small but relatively fast hard disk drives. A third, still lower performance tier could include large but relatively slow hard disk drives.

One problem with existing storage management methods and systems is that logical units and the slices thereof are allocated in a storage pool as "best-fit" at the initial allocation time. At this time, however, the IO load pattern of each logical unit and/or each slice of data is not known. In other words, a user's performance requirements with respect to a given logical unit or with respect to a given slice of data within that logical unit is generally either not known or only roughly approximated when that logical unit is created. Thus, the performance capability of a logical unit or slice can be too high or too low for the data to which it corresponds. For example, allocating a logical unit containing frequently accessed data to a lower performance tier in a storage pool will result in the storage pool appearing "slow" to a user. Likewise, allocating a logical unit containing rarely accessed data to a higher performance storage tier results in a waste of the storage system's performance capability. There is thus a need for methods and systems that can relocate frequently-accessed data to a higher-performance storage tier while relocating less-frequently-accessed data to a lower-performance storage tier.

Another problem with existing methods and systems is that they fail to compensate for the fact that users' performance requirements will often change over time, in part because data access patterns tend to change over time. Older data is generally accessed less frequently and therefore does not require storage with higher performance capabilities. In existing storage methods and systems, as once-frequently-accessed data ages, it can remain on a high performance storage tier, taking up valuable space that could be used to store newer, more-frequently-accessed data. Thus, as data "ages" and becomes less-frequently accessed, it can be desirable to relocate it to a lower performance storage tier. Existing methods and systems lack an automated mechanism to perform such relocation. A need exists then for methods and systems that can relocate older data to lower-performance storage tiers and at the same time relocate newer data to higher-performance storage tiers.

Yet another drawback to existing storage management methods and systems is that, when new storage devices are added to a storage pool, the benefit of the added storage device may not be utilized immediately. For example, a user might add additional, higher-performance storage systems or devices to a storage pool in an effort to increase throughput and reduce response times. Until data is stored on this new hardware, however, little or no performance gain will be observed. Accordingly, there is a need for methods and systems that can automatically relocate frequently accessed data to higher-performance storage systems or devices as they are added to a storage pool.

SUMMARY

The methods and systems disclosed herein generally involve selectively relocating data in a storage system or storage pool such that frequently-accessed data is stored on higher-performance storage tiers while less-frequently-accessed data is stored on lower-performance storage tiers.

In a first aspect, a method for relocating data in a physical storage pool is provided. The physical storage pool can include a plurality of storage tiers having differing performance characteristics and can be mapped into one or more logical units, each logical unit comprising a plurality of logical slices of data storage. The method can include receiving a relocation list, the relocation list including, for each of a plurality of logical slices, a slice identifier, a temperature value, and a current physical location, determining a destination tier for each logical slice on the relocation list, and evaluating for each logical slice on the relocation list a performance gain expected to be achieved by moving the logical slice from its current physical location to a new location in the destination tier. The method can further include relocating data in a logical slice from its current physical location to the new location based on the evaluation.

The temperature value of each logical slice can correspond to a historical frequency at which the data represented by the logical slice is accessed by a user and/or can correspond to a predicted frequency at which the data represented by the logical slice will be accessed by a user.

In one embodiment, the destination tier can include a plurality of RAID groups, each RAID group having an expected temperature and a performance capability, and the new location can be in a destination RAID group in the destination tier. The performance capability of each RAID group can be calculated based on a response time of the RAID group or on a number of input and output operations that the RAID group can process in one second.

The destination RAID group for each logical slice can be chosen such that the RAID groups in the destination tier have balanced workloads. Logical slices having a high temperature value can be assigned a destination RAID group having a low ratio of expected temperature to performance capability. The destination RAID group for each logical slice can also be chosen based on one or more constraints specified by a user.

In one embodiment, relocating data based on the evaluation can include giving priority to data relocations having the greatest expected performance gain.

In another exemplary embodiment, evaluating a performance gain can further include, for each logical unit, generating a list of logical slices corresponding thereto and then sorting each generated list of logical slices in order of the temperature value of each logical slice and/or generating an execution list comprising a plurality of entries, each entry corresponding to the logical slice in each generated list of logical slices with the highest temperature value. Evaluating a performance gain can also include sorting the execution list in order of the expected performance gain for each logical slice and relocating data can further include relocating data in each logical slice in the execution list.

In one embodiment, data relocation is only performed during a time period specified by a user. In certain embodiments, data relocation can be performed without substantially interrupting user access to the data in each logical slice and/or only one logical slice of any given logical unit is relocated at any given time.

Each logical slice can correspond to one gigabyte of data and relocating data can include copying the data from its current physical location to the new location and then, if successful, marking the current physical location as empty.

In a further aspect, a storage system is provided that includes a physical storage pool including a plurality of storage tiers having differing performance characteristics, the physical storage pool being mapped into one or more logical units, each logical unit comprising a plurality of logical slices of data storage. The system further includes a processor coupled to memory and in communication with the physical storage pool. The processor can be programmed to relocate data in a physical storage pool by receiving a relocation list, the relocation list including, for each of a plurality of logical slices, a slice identifier, a temperature value, and a current location, the current location including a current physical location, determining a destination tier for each logical slice on the relocation list, evaluating for each logical slice on the relocation list a performance gain expected to be achieved by moving the logical slice from its current physical location to a new location in the destination tier, and relocating data in a logical slice from its current physical location to the new location based on the evaluation.

In a still further aspect, a method for relocating data in a physical storage pool is provided. The storage pool can include a plurality of storage tiers having differing performance characteristics, the physical storage pool can be mapped to a plurality of logical units, and each logical unit can include at least one slice. The method can include receiving a pool candidate list including, for each of a plurality of slices, an entry comprising a slice identifier, a current tier, an optimal tier, and a temperature value, wherein the current tier for each listed slice is different from the optimal tier. The method can also include dividing the pool candidate list into a plurality of logical unit candidate lists, each logical unit candidate list including only entries corresponding to slices within a single logical unit and generating an execution list of the slices in each logical unit candidate list with the highest temperature value. The method can further include relocating the data corresponding to each slice in the execution list from a first physical location in the slice's current tier to a second physical location in the slice's optimal tier in order of expected performance gain.

BRIEF DESCRIPTION OF THE DRAWINGS

The invention will be more fully understood from the following detailed description taken in conjunction with the accompanying drawings, in which.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. A number of problems with conventional systems are noted in the "background" section of this application and the methods and systems disclosed herein may address one or more of these problems. By describing these problems, no admission as to their knowledge in the art is intended.

In general, systems and methods are provided that involve relocating data in a storage pool such that often-referenced, or "hot" data, is stored on a "fast" storage tier while less-often-referenced, or "cold" data, is stored on a "slow" storage tier.

Figure 1:
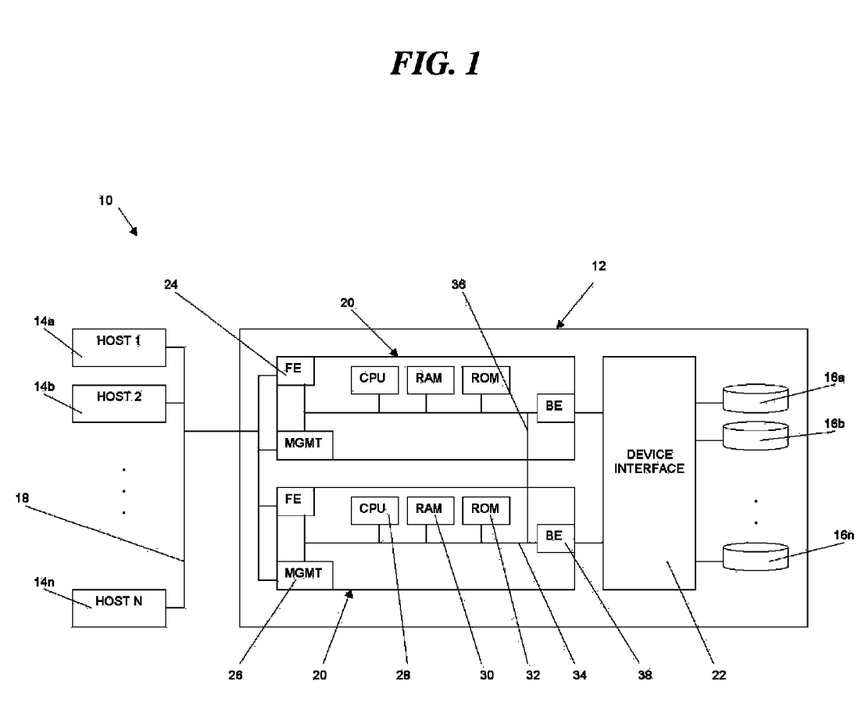
FIG. 1 is a block diagram of one embodiment of a storage system.

FIG. 1 illustrates one exemplary embodiment of a computer system 10 for performing one or more of the methods disclosed herein. The system 10 includes a data storage system 12 connected to a number of host systems 14a-14n through a communication medium 18. In this embodiment of the computer system 10, the n hosts 14a-14n can access the data storage system 12, for example, in performing IO operations or data requests. The communication medium 18 can be any one or more of a variety of networks or other types of communication connections as known to those skilled in the art. The communication medium 18 can be a network connection, bus, and/or any other type of data link, such as a hardwire or other connection known in the art. For example, the communication medium 18 can be the Internet, an intranet, a network (including a SAN) and/or other wireless or other hardwired connection(s) by which the host systems 14a-14n can access and communicate with the data storage system 12, and can also communicate with other components included in the system 10.

Each of the host systems 14a-14n can be connected to the communication medium 18 by any one of a variety of connections as may be provided and supported in accordance with the type of communication medium 18. The processors included in the host computer systems 14a-14n can be any one of a variety of proprietary or commercially available single or multi-processor systems, such as an Intel-based processor, or other type of commercially available processor able to support traffic in accordance with each particular embodiment and application.

It should be noted that the particular examples of the hardware and software that can be included in the data storage system 12 described herein are non-limiting examples and can vary with each particular embodiment. Each of the host computers 14a-14n and the data storage system 12 can all be located at the same physical site, or, alternatively, can also be located in different physical locations. The communication medium 18 can use a variety of different communication protocols, including without limitation SCSI, Fibre Channel (FC), iSCSI, SAS, and the like. Some or all of the connections by which the host computers 14a-14n and the data storage system 12 are connected to the communication medium can pass through other communication devices, such as a Connectrix, available from EMC Corporation of Hopkinton, Mass., or other switching equipment that may exist such as a phone line, a repeater, a multiplexer, and/or a satellite.

Each of the host computers 14a-14n can perform different types of data operations in accordance with different types of tasks. In the embodiment of FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12. Read and write requests can be addressed to the logical unit containing the data that the host and/or user seeks to manipulate.

It should be noted that although element 12 is illustrated as a single data storage system, such as a single data storage array, element 12 can also represent, for example, multiple data storage arrays alone, or in combination with, other data storage devices, systems, appliances, and/or components having suitable connectivity, such as in a SAN, in an embodiment using the methods disclosed herein. It should also be noted that an embodiment can include data storage arrays or other components from one or more vendors. In subsequent examples, reference may be made to a single data storage array available from a vendor, such as EMC Corporation of Hopkinton, Mass. As will be appreciated by those skilled in the art, however, the methods and techniques described herein are applicable for use with other data storage arrays by other vendors and with other components than as described herein for purposes of example.

The data storage system 12 can be a data storage array including one or more storage processors 20, a device interface 22, and a plurality of data storage devices 16a-16n. The storage processors 20 can include a front end 24 for interfacing with the communication medium 18. The storage processors 20 can also optionally include a management interface 26 separate from the front end 24 for performing various administrative tasks with respect to the storage system. In one embodiment, the management interface 26 can include various user input devices, such as a keyboard, a mouse, and/or a remote desktop interface and can include various output devices, such as a monitor, a printer, and/or a remote desktop interface. Each storage processor 20 can include one or more processors 28, a random-access memory 30, a read-only memory 32, and/or one or more busses 34 to connect the various components. As shown, a bridge bus 36 can be included to allow the processors 28 of one storage processor 20 to communicate directly with the memory and other components of the other storage processor 20. The storage processors 20 can also include a back end 38 for communicating with the device interface 22.

The methods disclosed herein can be performed by the processors 28 of the storage processors 20 according to instructions contained in a program, which can be stored in the ROM of one or more of the storage processors 20, or in a variety of other computer-readable storage media. For example, the program can be stored on the data storage devices 16a-16n, and/or on a USB drive, optical disc, or other storage medium known in the art which can be read and/or written by the storage processors 20 via the management interface 26 or otherwise. In one embodiment, the storage medium can be non-transitory.

The data storage devices 16a-16n can include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, can also be referred to as a RAM drive. SSD can refer to solid state electronics devices as distinguished from electromechanical devices, such as hard drives, having moving parts. Flash devices or flash memory-based SSDs are one type of SSD that contains no moving parts.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

Host systems provide data and access control information through channels to the storage systems, and the storage systems can also provide data to the host systems through the channels. The host systems do not address the drives or devices 16a-16n of the storage system 12 directly, but rather access to data can be provided to one or more host systems from what the host systems view as a plurality of logical devices or logical units. The logical units may or may not correspond to the actual physical devices or drives 16a-16n. For example, one or more logical units can reside on a single physical drive or multiple drives, or a variety of subsets of multiple drives. Data in a single data storage system, such as a single data storage array, can be accessed by multiple hosts allowing the hosts to share the data residing therein. A map can be kept by the storage array to associate host system logical addresses with physical device addresses.

As described above, the data storage system 12 can be a data storage array including a plurality of data storage devices 16a-16n in which one or more of the devices 16a-16n are flash memory devices employing one or more different flash memory technologies. In one embodiment, the data storage system 12 can be a Symmetrix® DMX™ data storage array and/or a CLARiiON® data storage array available from EMC Corporation of Hopkinton, Mass. In the foregoing data storage array, the data storage devices 16a-16n can include a combination of disk devices and flash devices in which the flash devices can appear as standard Fibre Channel drives to the various software tools used in connection with the data storage array. The disk devices can be any one or more different types of disk devices including, without limitation, ATA disk drives, FC disk drives, SATA disk drives, SAS disk drives, and the like. The flash devices can be constructed using different types of memory technologies such as non-volatile semiconductor NAND flash memory forming one or more SLC (single level cell) devices and/or MLC (multi level cell) devices. Additionally, flash memory devices and disk devices are two exemplary types of devices that can be included in a data storage system used in connection with the techniques described herein.

Thus, the storage system can be made up of physical devices with different physical and performance characteristics. Various factors can contribute to a device's performance characteristics, including for example the type of the physical devices, the speed of the devices (such as in RPMs if the devices are electromechanical disk drives), and/or the RAID levels, overhead, and configurations of the devices. In addition, various replication services (such as particular software used in the data storage system providing data replication), allocation of cache, processors used to service an I/O request, and the like can also impact performance.

The performance of a storage system can be quantified based on several dynamic factors, which can include, for example, factors related to current IO performance such as AST (average service time) representing the average amount of time it takes to service an event (e.g, service an IO request), ART (average response time) based on the AST, and/or the average amount of time the IO request waits. Other dynamic factors include, for example, utilization of different data storage system resources (e.g., particular logical or physical devices, CPU), measurement of cache hits and/or misses, and the like. The dynamic factors can vary with application workload, such as when particular applications may be more heavily performing IO operations.

Given the different performance characteristics, one or more tiers of storage devices can be defined. The physical devices in a storage pool can be partitioned into tiers based on the performance characteristics of the devices; grouping similar performing devices together. An embodiment using the techniques herein can define a hierarchy of multiple tiers. A set of data storage resources, such as logical and/or physical devices, a portion of cache, and services, such as a software vendor's service for providing data replication, can be bound to, or designated for use by, consumers in a particular tier.

Conversely, the particular performance characteristics can be applied to a storage pool with or without the definition of tiers. That is, the system can group devices within a storage pool by their characteristics with or without explicitly creating a set of tiers and may instead develop a more hybrid method or create a hierarchy based on the performance characteristics of the storage devices. In addition, the set of resources associated with or designated for use by a tier or grouping within a pool can be characterized as a dynamic binding in that the particular set of data storage system resources utilized by consumers in a tier can vary from time to time.

Figure 2:
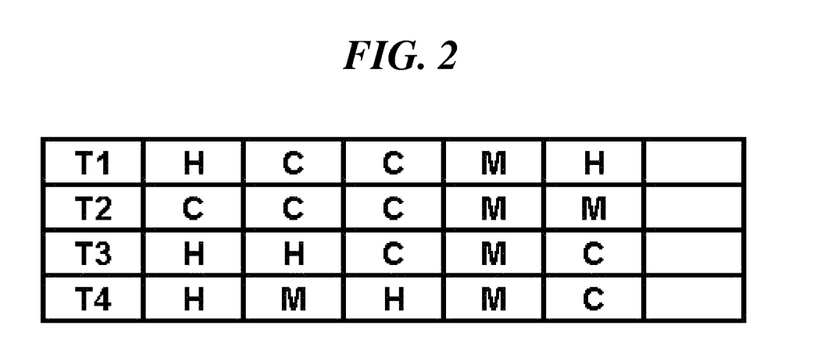
FIG. 2 is a map of one embodiment of a storage pool having non-optimal slice positioning.

FIG. 2 illustrates one example of a logical map of a storage pool. As shown, the storage pool includes four storage tiers, T1, T2, T3, and T4. The storage tiers T1-T4 can have progressively increasing performance characteristics such that tier T3 has a greater performance profile than tier T4, tier T2 has a greater performance profile than tier T3, and tier T1 has a greater performance profile than tier T2. For simplicity, the tiers T1-T4 are illustrated as each including six logical slices of data. A person having ordinary skill in the art will appreciate however that the various tiers in a storage pool need not necessarily have the same number of logical slices and that the number of logical slices that can be included within a single storage tier is virtually limitless. In one embodiment, each logical slice corresponds to one gigabyte of data. A person having ordinary skill in the art will appreciate, however, that slices can have virtually any size, ranging from very small to very large. In the illustrated embodiment, each block in the map represents one logical slice. Empty blocks represent slices of free space. Blocks labeled "H" represent slices that are "hot," meaning they have a high temperature value and therefore correspond to data that is relatively frequently accessed by users. Blocks labeled "C" represent slices that are "cold," meaning they have a low temperature value and therefore correspond to data that is relatively infrequently accessed by users. Blocks labeled "M" represent slices that are "medium," meaning they have a middle-range temperature value and therefore correspond to data that is accessed more frequently than cold slices, but less frequently than hot slices.

Users of the storage pool of FIG. 2 could benefit from a data relocation operation, since the current positioning of data within the pool is non-optimal. For example, several hot slices H and medium slices M are located on the lower performing tiers T3, T4 of the storage pool. At the same time, several cold slices C and medium slices M are located on the higher performing tiers T1, T2. Such a configuration can be wasteful of storage pool performance capability, since space on the higher performing tiers is being used for data that is rarely accessed by users and vice-versa. Relocating and reorganizing the slices of the illustrated storage pool can advantageously increase the perceived performance of the storage pool as a whole. As shown, each storage tier can include one or more "free" slices to facilitate migration of data between tiers and for storing new data generated by a user.

Figure 3:
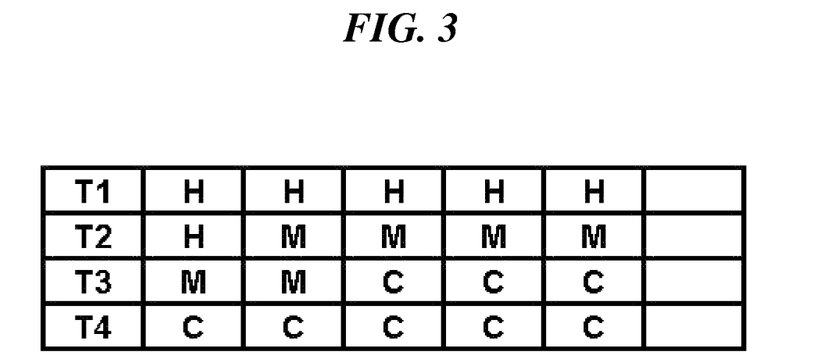
FIG. 3 is a map of the storage pool of FIG. 2 after a slice relocation operation is performed.

As shown in FIG. 3, the data in the storage pool of FIG. 2 can be relocated in order of slice temperature such that the hot slices H are located on the high-performance tier(s), the medium slices M are located on the medium-performance tier(s), and the cold slices C are located on the low-performance tier(s).

Figure 4:
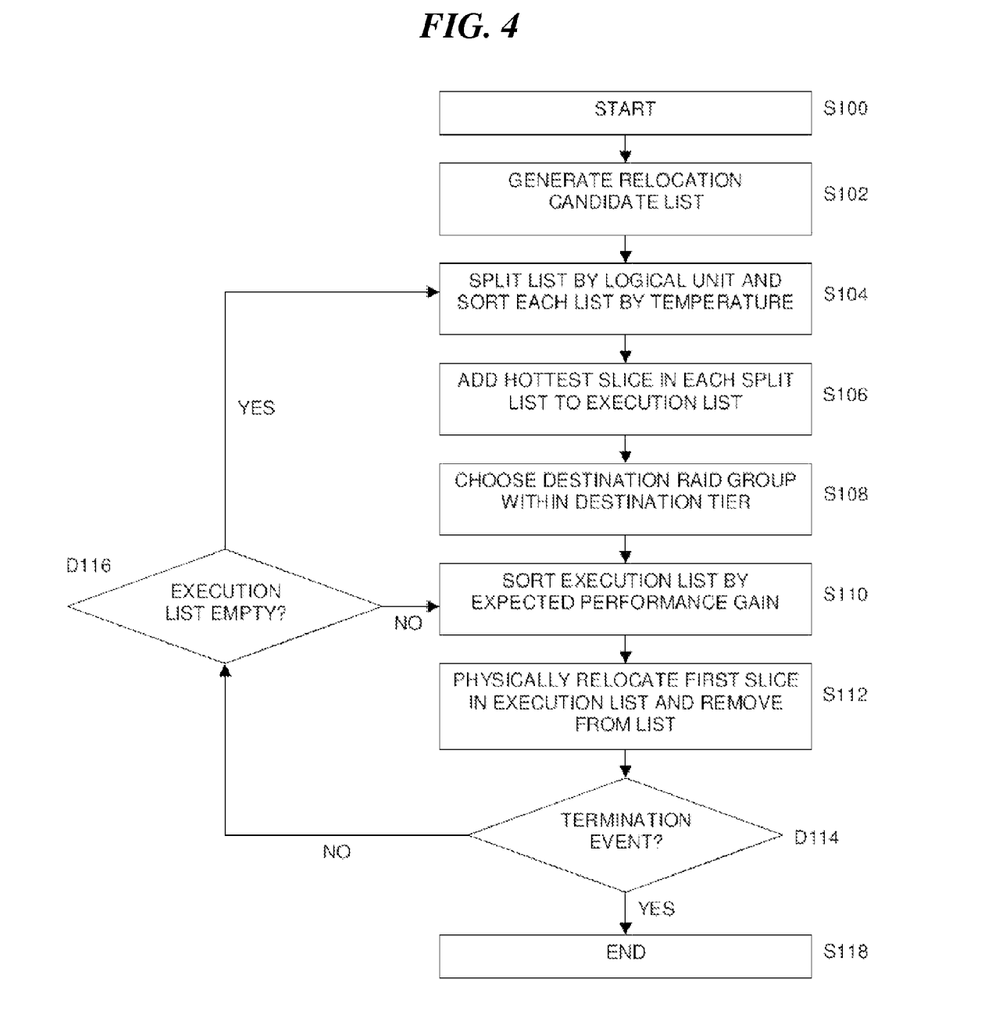
FIG. 4 is a flowchart of one embodiment of a method for relocating slices in a storage pool.

One exemplary method for achieving data relocation similar to that shown in FIG. 3 is illustrated in FIG. 4. While various methods disclosed herein are shown in relation to a flowchart or flowcharts, it should be noted that any ordering of method steps implied by such flowcharts or the description thereof is not to be construed as limiting the method to performing the steps in that order. Rather, the various steps of each of the methods disclosed herein can be performed in any of a variety of sequences. In addition, as the illustrated flowcharts are merely exemplary embodiments, various other methods that include additional steps or include fewer steps than illustrated are also within the scope of the present invention.

As shown, the method can begin with a step S100. The method can be initiated manually by a user, for example by entering a command in a command-line-interface or by clicking on a button or other object in a graphical user interface (GUI). The method can also be initiated automatically by storage management software and/or can be scheduled to run automatically at certain dates and times. In one embodiment, a storage system can be configured to execute the method of FIG. 4 for a pre-determined number seconds, minutes, etc. during some off-peak period in which the storage system is typically at its lightest IO load. Execution of the method can also be based on various user-specified constraints. For example, a user can specify that only one-thousand slice migrations should be executed in a single session, or that only 60 minutes should be spent relocating slices. A user can also specify that only one slice of each logical unit can be relocated in a single session or that certain logical units or slices should never be relocated. A user can also "throttle" relocation activity, for example by specifying a certain maximum amount of system bandwidth that can be used for performing relocations.

The method can further include a step S102 in which a "relocation candidate list" is generated. The relocation candidate list can include an entry for each slice in the storage pool along with various properties of each slice. For example, each slice in the list can have a slice identifier, a current physical location, a slice temperature, and/or various other properties. The slice identifier can be a number, character string, or any other data structure or label or combination thereof for uniquely referring to a particular slice. The current physical location of each slice can likewise be represented by a number, a character string, etc. for identifying the physical location at which the data represented by the slice is presently stored. For example, the current physical location of a slice can be the storage tier or tiers, raid group or groups, and/or disk drive or drives on which the data represented by the slice is stored.

Figure 5:
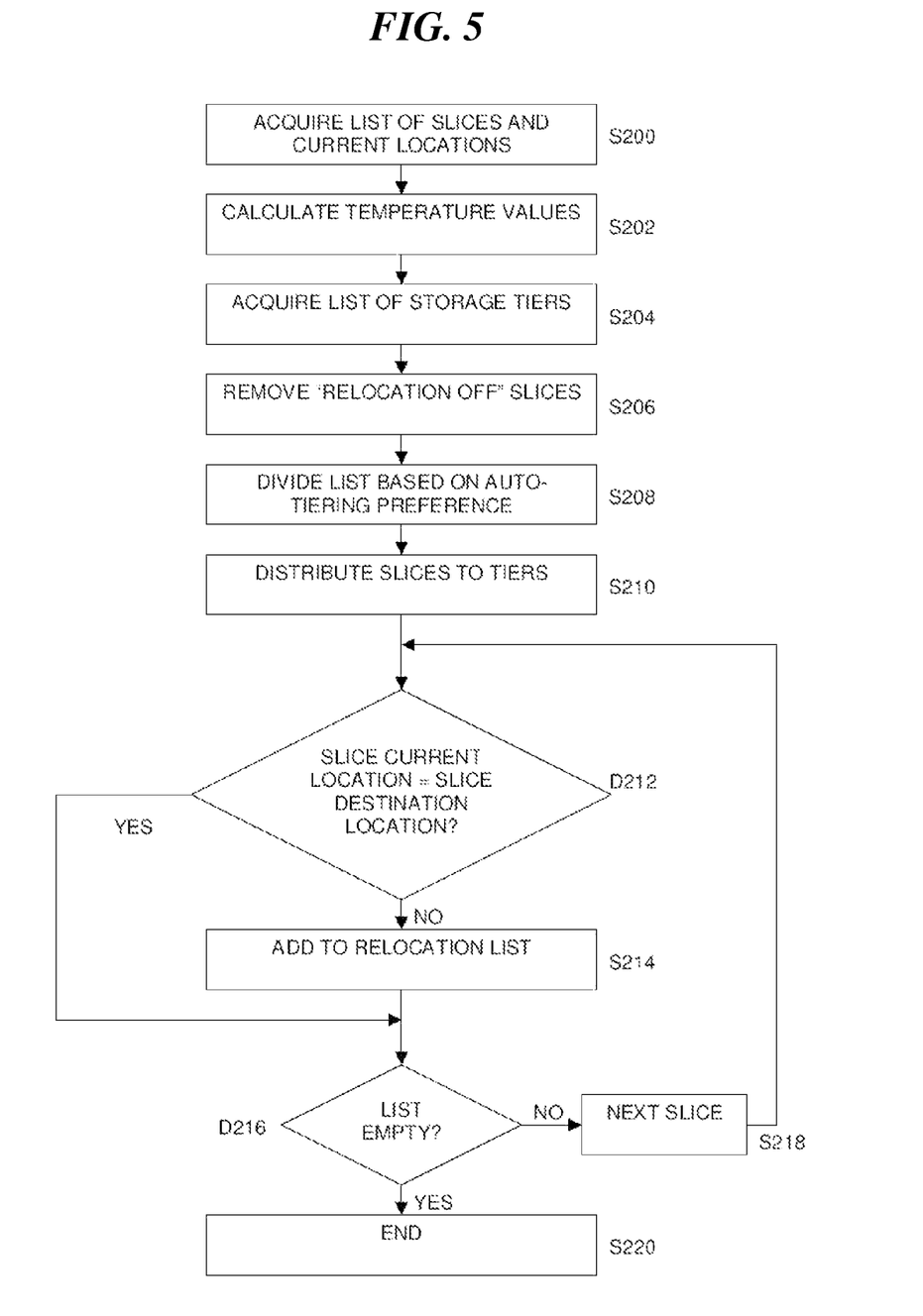
FIG. 5 is a flowchart of one embodiment of a method for generating a relocation candidate list.

FIG. 5 illustrates a flowchart of one exemplary algorithm for generating a relocation candidate list in accordance with step S102 of FIG. 4. The relocation candidate list can be generated based on the configuration of the storage pool and the temperatures of the various slices within the storage pool. In step S200, a raw list L of all slices in a storage pool is acquired along with various properties of each slice, for example by polling the various storage processors or storage devices that make up the storage pool. The method can also include a step S202 in which the temperature of each slice in the raw list L is determined and/or calculated.

To facilitate efficient and/or optimal data relocation, it can be desirable to quantify the "temperature" of a given block, slice, unit, or other grouping of data. The temperature of data can be indicative of a variety of factors, including for example the frequency and/or recency with which input or output requests relating to the data are issued or received. Data temperature can be an instantaneous measurement or can reflect a historical or long-term trend of a slice's "hotness" or "coldness," and can be used to predict the IO access pattern of a given slice in the near future. One method of determining the temperature of a slice of data is to use an exponential moving average (EMV). In such embodiments, various metrics such as total IO counts, block counts, and IO response time are collected initially for each slice and then sampled periodically thereafter. A slice temperature and an EMV of slice temperatures can be calculated for each sampling period and the slice temperature value in the raw list L can be updated accordingly. The collection and calculation of slice temperature data can be performed by a user-space application running on a storage processor, a storage system management station, a host server, and/or on a client machine.

EMV-type algorithms can have a low computation cost, since only the current IO activity and the latest temperature values are needed when updating temperature values for each slice. EMV algorithms can also incorporate a smoothing factor to reduce statistical measurement jitters in each sampling period. For example, a smoothing factor can be used to give more weight to more recent IO activity history and less weight to older IO activity history. The smoothing factor can be adjusted to improve the prediction accuracy of the temperature calculation by reducing jitters. In an exemplary embodiment, slice temperature is calculated using the following formula:

$$T_n = \alpha F_n + (1-\alpha) T_{n-1}$$

$T_n$ is the slice temperature of the $n^{th}$ period, $\alpha$ is the smoothing factor having a value between 0 and 1, $F_n$ is the slice's IO frequency in the $n^{th}$ period, and $T_{n-1}$ is the slice temperature in the $(n-1)^{th}$ period. The slice's IO frequency in the $n^{th}$ period, $F_n$, is given by the following formula:

$$F_n = \frac{H_n - H_{n-1}}{t_n - t_{n-1}}$$

$H_n$ is the slice IO activity from the $n^{th}$ period, which as discussed below is derived from a formula that uses raw IO statistics of the slice. $H_{n-1}$ is the slice IO activity from the $(n-1)^{th}$ period, $t_n$ is the timestamp of the $n^{th}$ period, and $t_{n-1}$ is the timestamp of the $(n-1)^{th}$ period.

As noted above, the IO activity of a slice of data during a given period, $H_n$, can be useful in calculating a slice temperature. The IO activity of a slice can be calculated in a variety of ways, including using raw slice access statistics, and the specific technique can depend on a variety of factors, including for example the IO traffic pattern of the system. In one embodiment, the IO activity of a slice can be represented simply by the total IO counts of the slice. In this case, $H_n$ will simply equal the number of IO requests received in the relevant period that address data stored in the slice. The slice temperature will be a moving average of the slice IO access rate and will thus reflect how often data in the slice is accessed. This way of representing slice IO activity can be desirable in applications in which the storage system is used to store large databases in which the number of input and output operations that can be processed in one second (IOPS) is the most important performance metric for a user and where a high cache hit ratio is not expected. In other applications in which there is a heterogeneous workload environment where cache hit ratio or IO block size differs significantly, alternative representations can be more desirable.

Another way of representing the IO activity of a slice of data during a given period, $H_n$, is to use the normalized total response time of the slice. For many users, improving response time is one of the most important aspects of storage system performance optimization, since many users measure IO response time as the ultimate performance indicator. In addition, response time can advantageously reflect and/or capture the compound effects of many different variables, including for example system load, IO traffic pattern (random vs. sequential), IO block size, cache hit ratio, RAID configuration, etc. Accordingly, using response time can eliminate the need to consider these factors independently. One additional factor that does need to be accounted for, however, is that IO response times from different storage tiers can differ considerably, since tiers can have vastly different underlying performance capabilities. For example, the IO response time of an enterprise flash drive (EFD) might be as much as 30 times faster than that of a Fibre Channel (FC) drive. Thus, it is possible that the total response time of a slice that is stored on an EFD drive or drives will be much faster than that of a slice stored on an FC drive or drives, and yet the EFD slice may service many more IO requests than the FC slice. To yield a meaningful comparison between these response time figures, it is necessary to take into account the underlying performance capability of the storage tier or device on which the slice is stored to arrive at a normalized slice total response time.

One method of normalizing response time values for a given slice is to estimate the performance capability of the RAID group (RG) or groups to which the slice belongs. This in turn reflects the performance capability of the underlying physical devices on which the data represented by the slice is stored. The performance capability of a RAID group can be estimated using the RAID group's maximum IO service rate or throughput. Multiplying the slice total response time by the RAID group's performance capability gives a normalized representation of the slice's true IO load, with physical storage capability skew eliminated. This calculation can be represented with the following formula:

$$H_n = \text{Normalize}(Srt_n) = Srt_n * (PE/PE_{min})$$

$H_n$ is the slice IO activity from the $n^{th}$ period, $Srt_n$ is the slice total response time from the $n^{th}$ period, PE is the performance capability of the RAID group in which the slice resides, and $PE_{min}$ is the minimum RAID group performance capability in the storage pool. It should be noted that the measured response time can be sensitive to system load. For example, in a heavily loaded storage system, a small increase of utilization may increase IO response time significantly.

Using this formula to calculate IO activity will thus make hot slices appear to be even hotter, which can in turn make the slice relocation decision algorithm more sensitive to slice load changes.

Another way of normalizing response time values for a given slice is to factor in the average response time of the RAID group in which the slice resides. For example, the slice's total response time can be divided by the RAID group's average response time to arrive at a normalized slice total response time, as shown in the following formula:

$$H_n = \text{Normalize}(Srt_n) = Srt_n / Fart_n$$

$H_n$ is the slice IO activity from the $n^{th}$ period, $Srt_n$ is the slice total response time from the $n^{th}$ period, and $Fart_n$ is the average IO response time from the $n^{th}$ period of the RAID group in which the slice resides. In this technique, if data access to a RAID group is uniformly distributed with the same IO access pattern, block counts, cache hit ratio, etc., the computed IO activity will be exactly the same as the IO access rate. On the other hand, if the data access intensity, cache hit ratio, or IO block counts are different for different slices in a given RAID group, the calculated IO activity will be different than IO access rate. To an extent, IO activity calculated using the quotient of slice total response time to RAID group average response time can be viewed as effective IO access rate, with such factors as the cache hit ratio, etc. built-in. Since response time changes caused by changes in system load will be reflected in both the slice total response time $Srt_n$ and the RAID group average response time $Fart_n$, this method of calculating IO activity eliminates any skew caused by system load changes.

Additional information on slice temperature calculation can be found in U.S. patent application Ser. No. 12/640,254, entitled "A METHOD FOR COMPUTING STORAGE DATA TEMPERATURE BASED ON STORAGE LOAD", and filed on an even date herewith. This application is hereby incorporated herein in its entirety.

Once a temperature is computed for each slice, it can be used to predict future slice IO activity and to help determine optimal data placement among storage tiers having differing performance characteristics. Before slices are actually relocated, it can be desirable to decide the best physical storage location for each slice in the storage pool. Accordingly, the method of FIG. 5 for generating a relocation candidate list can also include determining a destination tier for each slice in the raw list L.

First, in step S204, a tier list T is acquired or constructed of all storage tiers within the storage pool. Various attributes can be determined and/or tracked using counters for each tier in the list T, including for example the number of free slices in the tier, the number of used slices in the tier, the tier's capacity limit, and or the tier's total temperature limit. The number of free slices is simply the number of slices in the tier that are available for data allocation. The number of used slices is the number of slices that are presently storing user data. The capacity limit of a tier is the maximum number of slices that can be placed within the tier. This number can be less than the usable capacity of the tier, as it can be desirable to ensure that a certain amount of free space is always available to facilitate new slice allocations and slice relocation operations. For example, ensuring that a certain percentage of a high-performance tier is always free allows migration of a hot slice to that tier without having to wait for a cold slice to first be migrated off of that tier. Similarly, maintaining a certain amount of free space on each tier can permit more efficient initial placement of slices at allocation time, as a user's first choice of tier for a new slice will always be available. In one embodiment, the capacity limit of each tier can be set to a default value of 90% of the true usable capacity of the tier. The capacity limit or the default value thereof can be changed by the user. In addition, when the capacity of every tier is at or above the limit, the capacity limit can be automatically increased up to the true usable capacity.

The total temperature limit of a tier can be used to prevent overloading of the tier or to facilitate load balancing among several tiers. This value can be user-defined or can be determined automatically based on the system configuration. The total temperature of a tier can represent an aggregate of the temperatures of all RAID groups within the tier. By placing a limit on this total temperature, overloading of the tier and/or RAID group can be prevented. In one embodiment, the total temperature limit of a tier is simply the sum of the total temperature limits of all RAID groups within the tier.

Once a list T of all storage tiers is constructed, the raw list L of all slices in a storage pool can be narrowed to the relocation candidate list. As noted above, the list L generally contains an entry for each slice that includes various information about the slice. In one embodiment, the list L includes, for each slice in the storage pool, the slice's temperature and the slice's auto-tiering preference. The auto-tiering preference of a slice is a value that can be set by a user or can be set automatically by storage system management software. The slice auto-tiering preference can also be derived from the tier properties to which the slice is allocated. For example, auto-tiering preferences can optionally be set at the tier level, such that all slices in that tier, whether presently existing or allocated in the future, will always have the same auto-tiering preference. Possible values for the auto-tiering preference can include "relocation off," indicating that the slice should never be relocated, "high tier preference," indicating that the slice should be placed on a high-performance tier whenever possible, "low tier preference," indicating that the slice should be placed on a low-performance tier whenever possible, or "optimal," indicating that the slice has no particular preference and thus should be placed on a highest-performing tier having adequate free space for the slice.

To narrow the raw list L down to a list of relocation candidate slices, all slices with a "relocation off" auto-tiering preference can be removed from the list in step S206. As such slices are removed from the list, the capacity limit counter for the tier in which the slice is located can be decremented. Similarly, the total temperature limit of the tier can be decremented by the temperature of the removed slice. The raw list L can then be split in step S208 into three separate lists L1, L2, L3 based on auto-tiering preference such that L1 lists all slices with a "high tier preference," L2 lists all slices with a "low tier preference," and L3 lists all slices with an "optimal" preference.

In subsequent step S210, the slices in the lists L1, L2, and L3 can be "distributed" to the various tiers in the tier list T. Slices in the list L1 (slices having a "high tier preference") can be distributed to the highest-performance tier of storage in order of slice temperature. Thus, the hottest slices in the list L1 will be distributed first. As each slice is distributed to a tier in the tier list T, the capacity limit counter for that tier is decremented by one and the tier temperature limit is decremented by the temperature of the distributed slice. If slices can no longer be distributed to the highest-performing tier (e.g., because the tier is "full," meaning its capacity limit counter is zero or its slice temperature limit is zero), the remaining slices in the list L1 are distributed to the next-highest-performing tier in the storage pool. The process continues until all slices in the list L1 are distributed to a storage tier.

Slices in the list L2 (slices having a "low tier preference") can be distributed to the lowest-performance tier of storage in reverse order of slice temperature. Thus, the coldest slices in the list L2 will be distributed first. Again, as each slice is distributed to a tier, the tier capacity limit counter is decremented by one and the tier temperature limit is decremented by the temperature of the distributed slice. If slices can no longer be distributed to the lowest-performing tier (e.g., because the tier is "full," meaning its capacity limit counter is zero or its slice temperature limit is zero), the remaining slices in the list L2 are distributed to the next-lowest-performing tier in the storage pool. The process continues until all slices in the list L2 are distributed to a storage tier.

After all the slices in the lists L1, L2 are distributed, the slices in the list L3 (slices having an "optimal" preference) can be distributed to the remaining tiers, starting with the highest-performance non-full tier. The slices in the list L3 can be distributed in order of slice temperature such that the hottest slices in the list L3 are be distributed first. Again, as each slice is distributed to a tier, the tier capacity limit counter is decremented by one and the tier temperature limit is decremented by the temperature of the distributed slice. If slices can no longer be distributed to the current tier (e.g., because the tier is "full," meaning its capacity limit counter is zero or its slice temperature limit is zero), the remaining slices in the list L3 are distributed to the next-highest-performing, non-full tier in the storage pool. The process continues until all slices in the list L3 are distributed to a storage tier.

A relocation candidate list can be generated once all the slices in the lists L1, L2, and L3 are distributed to a storage tier. When a slice is "distributed" to a tier, it only means that a logical association is formed between the slice and the tier, not that the data represented by the slice has actually been physically relocated to that tier. For each slice in the lists L1, L2, L3, the slice's current location (the storage tier on which the data represented by the slice presently resides) is compared with the slice's destination location (the storage tier to which the slice has been distributed) in decision block D212. If a slice's current location differs from its destination location, the slice is added to the relocation candidate list at step S214 and removed from the list L1, L2, or L3. Otherwise, the slice is removed from the list L1, L2, or L3 without being added to the relocation candidate list. If it is determined at decision block D216 that slices remain in the lists L1, L2, L3, then the next slice is selected at step S218 and evaluated at decision block D212. The process repeats until step S220, which is reached when no slices remain in the lists L1, L2, L3.

A single "master" relocation candidate list can be maintained and/or a separate relocation candidate lists can be maintained for each tier in the storage pool. Summary reports, charts, graphs, tables, etc. can be displayed to the user at various points in the list generation process to indicate progress and/or to provide the user with information to make a decision as to whether slice relocation is desirable.

Additional information on generation of a slice relocation candidate list can be found in U.S. patent application Ser. No. 12/640,292, entitled "A METHOD OF DETERMINING OPTIMAL DATA PLACEMENT AMONG STORAGE TIERS BASED ON STORAGE LOAD", and filed on an even date herewith. This application is hereby incorporated herein in its entirety.

Once the slice relocation candidate list has been generated in step S102 of FIG. 4, it can be divided into separate "logical unit candidate lists" for each logical unit in the storage pool in step S104. As will be apparent from the description below, division of the relocation candidate list by logical unit can ensure that only one slice from any given logical unit is queued for relocation at any given time. This can desirably permit relocation to be performed without substantially interrupting user access to the data represented by the slices being relocated.

Figure 6:
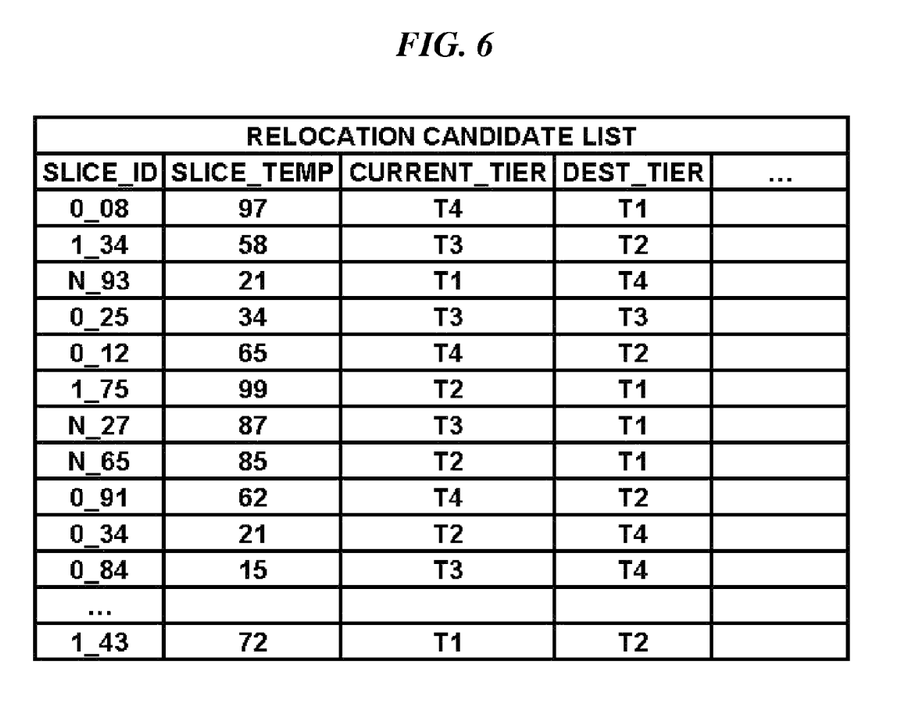
FIG. 6 is a truncated view of one embodiment of a relocation candidate list.

FIG. 6 shows one embodiment of a relocation candidate list before division. The illustrated list is an example of one that might be generated for a storage pool having four tiers T1-T4 (T1 being the "fastest") and N logical units, each logical unit comprising 100 slices. A person having ordinary skill in the art will appreciate that a logical unit can have a virtually unlimited number of slices and that a storage pool can have a virtually limitless number of storage tiers. In the illustrated embodiment, each slice is represented by a slice identifier comprising two integers separated by an underscore. The first integer indicates the logical unit to which the slice belongs and the second integer represents a unique slice designator. For example, the first entry in the illustrated list has the slice identifier 0_08, which in this embodiment indicates that the slice is the eighth slice in logical unit zero. In the illustrated embodiment, the slice temperature is an integer between 0 and 99, with 0 being the coldest possible temperature and 99 being the hottest. A skilled artisan will appreciate that this format for slice temperature is selected only for simplicity of illustration, and that much finer or coarser definition of slice temperature can be achieved, for example by using a floating point value or by narrowing or expanding the upper and lower bounds.

As shown, each slice in the relocation candidate list has a current tier/location and a destination tier/location which differ from one another. The data represented by slice 0_08 for example is currently physically stored/located on disks or other storage devices that belong to tier T4. Since slice 0_08 is a relatively "hot" slice (as indicated by its temperature value of 97), it has been determined by the relocation candidate list generation algorithm that slice 0_08 should be relocated to the highest-performance tier in the storage pool, tier T1. As another example, the ninety-third slice in logical unit N (slice N_93) is relatively cold, as indicated by its temperature value of only 21. Since this slice is presently located on the fastest tier T1, it has been determined that a relocation of this slice to the slowest tier T4 would improve the perceived performance of the system, for example by freeing up space on tier T1 for other, hotter slices.

Figure 7:
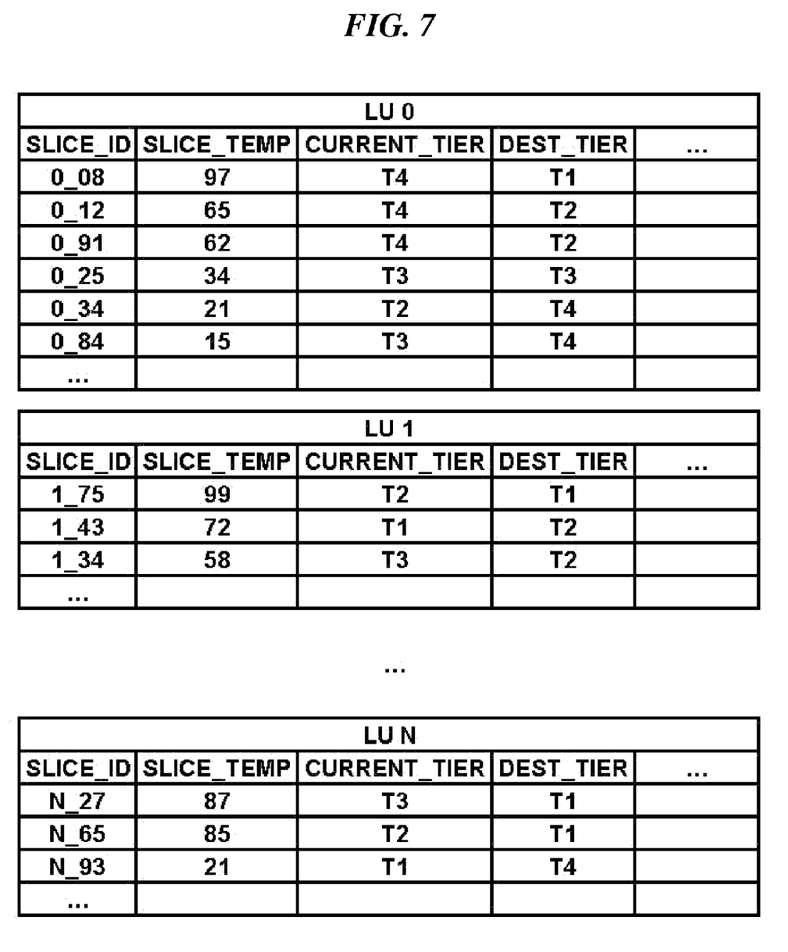
FIG. 7 is a truncated view of the relocation candidate list of FIG. 6 having been divided into one or more logical unit candidate lists.

FIG. 7 shows the relocation candidate list of FIG. 6 after having been divided in step S104 of FIG. 4 into multiple logical unit candidate lists. As shown, a separate logical unit relocation candidate list has been generated for each logical unit 0-N. In addition, the lists for each logical unit have been sorted in order of slice temperature, with the hottest slices appearing first in the list.

In step S106 of FIG. 4, the hottest slice in each of the logical unit candidate lists is added to an execution list E and removed from the logical unit candidate lists. In certain cases however, it can be desirable to move a different slice from each of the divided logical unit candidate lists to the execution list E, as will be discussed below with respect to step S108.

In step S108 of FIG. 4, a destination RAID group within the destination tier of each slice in the execution list E can optionally be selected. Selecting a specific RAID group can allow for more precise and granular relocation of data within the available physical storage devices. In selecting a particular RAID group within a storage tier, it can be desirable to maintain a balanced load distribution amongst the constituent RAID groups. This generally requires more than simply selecting the coldest RAID group. For example, in one embodiment, a balanced load can be accomplished by always selecting the RAID group with the lowest ratio of expected temperature to performance capability. For each RAID group in the tier, a data structure can be maintained that can include counters for tracking the total temperature of the RAID group and the available space of the RAID group. When it is necessary to select a RAID group, the available space of each RAID group in the tier is checked. If all of the RAID groups are full, an error is returned, and the slice is removed from the execution list and replaced with the next hottest slice in the logical unit candidate list. Otherwise, the non-full RAID group with the lowest ratio of temperature to performance capability is selected.

In one embodiment, performance capability can be expressed as a number such that a lower value indicates a lower-performing hardware configuration and a higher value indicates a higher-performing hardware configuration. In other words, a RAID group having a low temperature (e.g., a RAID group that is not often accessed) but a high performance capability (e.g., a RAID group comprised of enterprise flash drives), would be a more favorable destination for a slice being relocated than another RAID group having the same hardware configuration but a higher temperature value. Similarly, if two RAID groups have an identical temperature value, but one is comprised of faster Enterprise Flash Drives while the other is comprised of slower Fibre Channel drives, the temperature to performance capability ratio would be lower for the Enterprise Flash Drives and therefore that RAID group would be selected. It is therefore possible that a warmer RAID group could be selected over a colder one if the devices that make up that RAID group have greater inherent performance capabilities. The numerical performance capability can be derived from a variety of properties of the underlying physical hardware. For example, in one embodiment, performance capability can be derived from the raw IOPS capability of a disk drive, the number of drives within the RAID group, and/or the RAID overhead. Alternatively, or in addition, the performance capability of a RAID group can be proportional to the response time, the maximum throughput, or the IO service rate of the RAID group.

Once selected, the free space counter of the selected RAID group is decremented by one slice and the temperature counter of the selected RAID group is incremented by the slice's temperature. Once relocation of the slice is completed, the free space counter of the slice's original location can be incremented and the temperature counter of the original RAID group can be decremented by the temperature of the slice.

If no RAID group could be found, for example because insufficient space exists in the destination tier, or if the selected RAID group already appears in the slice execution list, the slice is moved from the execution list E back to the divided list and the next-hottest slice in the divided logical unit candidate list is chosen instead. Eventually, as the execution list E and the divided logical unit candidate lists are traversed, a cold slice in the once-full RAID group will be relocated to a lower tier, at which time space will be freed up for the hotter slice that was passed over earlier to be relocated. When the passed over slice comes around again in the execution list E, it will be relocated since space is now available in the destination RAID group. This aspect of the method can advantageously prevent deadlock situations in which several hot slices are queued for relocation but no room exists due to the destination tier and/or destination RAID group being clogged with cold slices or vice-versa.

Figure 8:
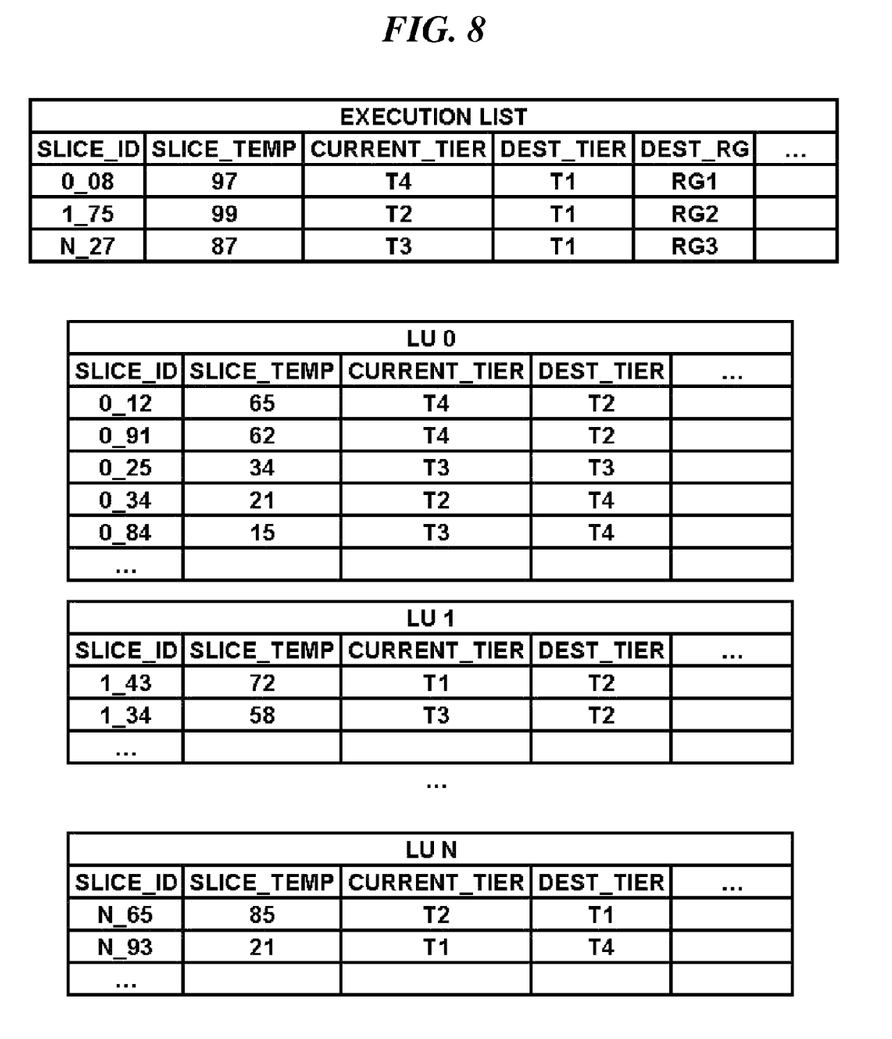
FIG. 8 is a truncated view of one embodiment of an execution list and the logical unit candidate lists of FIG. 7 after having been modified.

In step S110, the execution list is sorted in order of expected performance gain. FIG. 8 illustrates an execution list E generated from the divided logical unit candidate lists of FIG. 7 as well the updated divided lists themselves. As shown, the execution list E includes the hottest slice from each of the several divided lists, and includes a destination RAID group for each slice. In addition, the execution list E is sorted in order of expected performance gain. For example, even though the temperature value of slice 1_75 (temperature=99) is slightly higher than that of slice 0_08 (temperature=97), slice 0_08 appears first in the execution list because it has the greatest expected performance gain. This is due in part to the fact that slice 0_08 is presently stored on the slowest tier in the storage pool (tier T4). Moving this slice from the slowest tier T4 to the fastest tier T1 will have a greater expected performance gain than moving the slice 1_75 from tier T2 (which is already relatively fast) to the fastest tier T1. Determining the expected performance gain for a given relocation will also depend on the method used to calculate the slice temperature and/or any normalization that may be required, as explained above. In one embodiment, comparison of the current throughput is compared to the throughput of the destination location. Prioritizing the execution list in such a way ensures that the greatest possible performance gain is achieved, particularly when a user places constraints on the number of relocations that can be performed or on the amount of time that can be spent on relocation.

Having generated and sorted an execution list, the actual physical relocation of the data corresponding to each slice can be performed, beginning with step S112. In one embodiment, the relocation is performed by instructing the kernel of one or more of the storage processors in the storage pool to carry out the relocation. For example, the kernel can be instructed to copy the data corresponding to the slice to be relocated from its current location on one or more storage devices in a first tier to its destination RAID group within its destination tier. The kernel can be polled for status and, when the data is successfully copied, the slice can be removed from the execution list and the original physical location at which the data was stored can be marked as free space. The original location can also be marked free as soon as the data contained therein is copied into memory. The original location can also optionally be actively cleared by storing "dummy" data patterns to prevent a malicious user from later recovering the data that was once stored there.

After the first slice in the execution list has been relocated, a termination event is checked for at decision block D114. There are a variety of possible termination events that should trigger a stop in the slice relocation processing. For example, if all slices in the relocation candidate list are optimally relocated, if a user-specified maximum number of slices to relocate has been reached, or if a user-defined window within which to perform slice calculation has elapsed, slice relocation can cease. Other conditions can also trigger a stoppage of relocation processing, for example if IO load on the storage pool becomes unexpectedly high, if a hardware failure occurs such that the system is no longer running in a high-availability (HA) mode, if a user presses a cancel or abort button, or if certain power-saving profiles are selected by the user. Upon occurrence of a termination event, the relocation process ends at step S118. Otherwise, the execution list is checked for remaining entries. If the execution list is non-empty, the method resumes execution at step S110 and the execution list E is again sorted by expected performance gain and the new first slice is relocated. If the execution list is empty, but a termination event has yet to occur, the method resumes execution at step S104 and additional relocation candidates can be relocated.

In one embodiment, a storage system is provided for performing the various methods and techniques disclosed herein. The storage system can include a physical storage pool having multiple storage tiers of differing performance capabilities or characteristics and that are mapped into one or more logical units, each logical unit including one or more logical slices. The system can also include a processor coupled to memory and in communication with the physical storage pool. Examples of such configurations can include one or more storage processors, management workstations, client machines, and/or a host servers, as shown for example in FIG. 1 and described above.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method for relocating data in a physical storage pool comprising a plurality of storage tiers having differing performance characteristics, the physical storage pool being mapped into one or more logical units, each logical unit comprising a plurality of logical slices of data storage, the method comprising:
   receiving a relocation list, the relocation list including, for each of a plurality of logical slices, a slice identifier, a temperature value, and a current physical location;
   determining a destination tier for each logical slice on the relocation list;
   evaluating for each logical slice on the relocation list a performance gain expected to be achieved by moving the logical slice from its current physical location to a new location in the destination tier; and
   relocating data in a logical slice from its current physical location to the new location based on the evaluation;
   wherein the destination tier comprises a plurality of RAID groups, each RAID group having an expected temperature value and a performance capability value, the performance capability value being proportional to the throughput of the RAID group; and
   wherein the new location is in a destination RAID group selected based on a ratio of expected temperature value to performance capability value.

2. The method of claim 1, wherein the temperature value of each logical slice corresponds to a historical frequency at which the data represented by the logical slice is accessed by a user.

3. The method of claim 1, wherein the temperature value of each logical slice corresponds to a predicted frequency at which the data represented by the logical slice will be accessed by a user.

4. The method of claim 1, wherein the performance capability value is calculated based on a response time of the RAID group or a number of input and output operations that the RAID group can process in one second.

5. The method of claim 1, wherein the destination RAID group for each logical slice is chosen such that the RAID groups in the destination tier have balanced workloads.

6. The method of claim 1, wherein the destination RAID group has, among the plurality of RAID groups, the lowest ratio of expected temperature value to performance capability value.

7. The method of claim 1, wherein the destination RAID group for each logical slice is chosen based on one or more constraints specified by a user.

8. The method of claim 1, wherein relocating data based on the evaluation includes giving priority to data relocations having the greatest expected performance gain.

9. The method of claim 1, wherein evaluating a performance gain further comprises, for each logical unit, generating a list of logical slices corresponding thereto and then sorting each generated list of logical slices in order of the temperature value of each logical slice.

10. The method of claim 9, wherein evaluating a performance gain further comprises generating an execution list comprising a plurality of entries, each entry corresponding to the logical slice in each generated list of logical slices with the highest temperature value.

11. The method of claim 10, wherein evaluating a performance gain further comprises sorting the execution list in order of the expected performance gain for each logical slice.

12. The method of claim 11, wherein relocating data further comprises relocating data in each logical slice in the execution list.

13. The method of claim 1, wherein each logical slice corresponds to one gigabyte of data.

14. The method of claim 1, wherein data relocation is only performed during a time period specified by a user.

15. The method of claim 1, wherein data relocation is performed without interrupting user access to the data in each logical slice.

16. The method of claim 1, wherein only one logical slice of any given logical unit is relocated at any given time.

17. The method of claim 1, wherein relocating data comprises copying the data from its current physical location to the new location and then, if successful, marking the current physical location as empty.

18. A storage system comprising:
   a physical storage pool including a plurality of storage tiers having differing performance characteristics, the physical storage pool being mapped into one or more logical units, each logical unit comprising a plurality of logical slices of data storage;
   a processor coupled to memory and in communication with the physical storage pool;
   wherein the processor is programmed to relocate data in a physical storage pool by:
   receiving a relocation list, the relocation list including, for each of a plurality of logical slices, a slice identifier, a temperature value, and a current location, the current location including a current physical location;
   determining a destination tier for each logical slice on the relocation list;
   evaluating for each logical slice on the relocation list a performance gain expected to be achieved by moving the logical slice from its current physical location to a new location in the destination tier; and
   relocating data in a logical slice from its current physical location to the new location based on the evaluation;
   wherein the destination tier comprises a plurality of RAID groups, each RAID group having an expected temperature value and a performance capability value, the performance capability value being proportional to the throughput of the RAID group; and
   wherein the new location is in a destination RAID group selected based on a ratio of expected temperature value to performance capability value.

19. A method for relocating data in a physical storage pool comprising a plurality of storage tiers having differing performance characteristics, the physical storage pool being mapped to a plurality of logical units, each logical unit comprising at least one slice, the method comprising:
   receiving a pool candidate list including, for each of a plurality of slices, an entry comprising a slice identifier, a current tier, an optimal tier, and a temperature value, wherein the current tier for each listed slice is different from the optimal tier;

dividing the pool candidate list into a plurality of logical unit candidate lists, each logical unit candidate list including only entries corresponding to slices within a single logical unit;

generating an execution list that only includes, for each of the logical unit candidate lists, an entry corresponding to the slice in that logical unit candidate list with the highest temperature value; and relocating the data corresponding to each slice in the execution list from a first physical location in the slice's current tier to a second physical location in the slice's optimal tier in order of expected performance gain.

* * * * *